(12) United States Patent
Tanaka et al.

(10) Patent No.: US 11,123,995 B2
(45) Date of Patent: Sep. 21, 2021

(54) RECORDING METHOD, RECORDING APPARATUS AND RECORDED MATTER

(71) Applicant: CANON KABUSHIKI KAISHA, Tokyo (JP)

(72) Inventors: Takatoshi Tanaka, Tokyo (JP); Kenichi Iida, Kawasaki (JP); Kazuhiko Araki, Kawasaki (JP); Tetsufumi Shiba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/583,017

(22) Filed: Sep. 25, 2019

(65) Prior Publication Data

US 2020/0101757 A1  Apr. 2, 2020

(30) Foreign Application Priority Data

Sep. 28, 2018  (JP) .............................. JP2018-184608
Aug. 23, 2019  (JP) .............................. JP2019-153143

(51) Int. Cl.
*B41J 2/21* (2006.01)
*B41J 2/01* (2006.01)

(52) U.S. Cl.
CPC ....... *B41J 2/211* (2013.01); *B41J 2/01* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/045; B41J 11/0015; B41J 11/002; B41J 2/04581; B41J 2/055; B41J 2/16538; B41J 2/14201; B41J 2002/16502; B41J 29/02; B41J 2/17513; B41J 2/17509; B41J 29/13;
(Continued)

(56) References Cited

U.S. PATENT DOCUMENTS 6,536,890 B1 *  3/2003  Kato ................... B41M 5/0017
                                                      347/100
8,574,356 B2 * 11/2013  Kagata ................. C09D 11/322
                                                      106/31.9
(Continued)

FOREIGN PATENT DOCUMENTS

| CN | 1642749 A | 7/2005 |
|----|-----------|--------|
| CN | 1802262 A | 7/2006 |
| JP | 2010507727 A | 3/2010 |
| JP | 2015193126 A | 11/2015 |
| WO | 2006082669 A1 | 8/2006 |
| WO | 2018/080436 A1 | 5/2018 |

*Primary Examiner* — Manish S Shah
(74) *Attorney, Agent, or Firm* — Canon U.S.A., Inc. IP Division

(57) ABSTRACT

A recording method includes a step of applying a first ink to a recording medium; and a step of recording an image on the recording medium by applying a second ink so that the second ink at least partially overlaps a region to which the first ink has been applied. The first ink is an aqueous ink containing a silver particle. The second ink is an aqueous ink containing a coloring material. The recording medium has an ink receiving layer that contains a halide ion selected from the group consisting of a bromide ion and an iodide ion. The ink receiving layer has a halide ion content (mmol/$m^2$) of 0.1 mmol/$m^2$ or more to 0.8 mmol/$m^2$ or less.

17 Claims, 1 Drawing Sheet

(58) Field of Classification Search
CPC .... B41J 2/17553; B41J 2/1606; B41J 2/1642;
B41J 2/1609; B41J 2/164; B41J 2/162;
B41J 2/161; B41J 2/19; B41J 15/04;
B41J 25/001; B41J 25/34; B41J 25/003;
B41J 25/312; B41J 2025/008; B41J
2202/21; B41J 2/17596; B41J 2/16508;
B41J 2/1652; B41J 2/175; B41J 2/17563;
C09D 11/36; C09D 11/40; C09D 11/30;
C09D 11/38; C09D 11/32; C09D 11/322;
C09D 11/324; C09D 11/328; C09D
11/101; C09D 11/102; C09D 11/005;
C09D 11/54; C09D 11/52; C09D 11/106
See application file for complete search history.

(56) References Cited

U.S. PATENT DOCUMENTS

| | | | |
|---|---|---|---|
| 2004/0086666 A1* | 5/2004 | Yoshimura | B41M 5/52 428/32.1 |
| 2004/0166252 A1* | 8/2004 | Takashima | B41M 5/5218 428/32.1 |
| 2005/0007431 A1* | 1/2005 | Koyano | B41M 5/0017 347/95 |
| 2010/0227181 A1* | 9/2010 | Kitamura | C09D 11/037 428/457 |
| 2014/0220259 A1 | 8/2014 | Wang | |
| 2015/0273884 A1* | 10/2015 | Ohishi | B41J 11/0015 347/21 |

* cited by examiner

RECORDING METHOD, RECORDING APPARATUS AND RECORDED MATTER

BACKGROUND

Field of the Disclosure

The present disclosure relates to a recording method, a recording apparatus and a recorded matter.

Description of the Related Art

Ink that contains a metal particle has been used to form an electrical circuit by utilizing the electrical conductivity of the metal particle; however, in recent years, the use of such an ink has increased, finding utility such as a Christmas card, that expresses a metallic appearance. In particular, there has been demand for imparting color tone to an image having metallic appearance, in other words, demand for recording a "color metallic image". Japanese Patent Laid-Open No. 2015-193126 proposes a method for recording a color metallic image by applying a treatment agent containing an inorganic particle to a recording medium having an ink receiving layer formed thereon in advance, and then sequentially applying an aqueous ink containing a silver particle and an aqueous ink containing a pigment.

The innovators of the present disclosure have recorded a color metallic image by an ink jet recording method described in Japanese Patent Laid-Open No. 2015-193126 and studied the obtained image. As a result, it has been found that the color tone of the pigment ink is not easily recognized from the image and there are cases where the color developability is insufficient or the metallic appearance is lost due to degradation of glossiness when the image is stored.

SUMMARY

Thus, the present disclosure provides a recording method and a recording apparatus with which a color metallic image having excellent color developability and excellent glossiness even after the image is stored, can be recorded. In addition, the present disclosure provides a color metallic recorded matter having excellent color developability and excellent glossiness even after the image is stored.

A recording method according to the present disclosure includes a step of applying a first ink to a recording medium and a step of recording an image on the recording medium by applying a second ink so that the second ink at least partially overlap a region to which the first ink has been applied. The first ink is an aqueous ink contains a silver particle. The second ink is an aqueous ink containing a coloring material. The recording medium has an ink receiving layer containing a halide ion selected from the group consisting of a bromide ion and an iodide ion and the content (mmol/m$^2$) of the halide ion in the ink receiving layer is 0.1 mmol/m$^2$ or more to 0.8 mmol/m$^2$ or less.

Further features of the present disclosure will become apparent from the following description of exemplary embodiments with reference to the attached drawings.

DESCRIPTION OF THE EMBODIMENTS

Figure 1A:
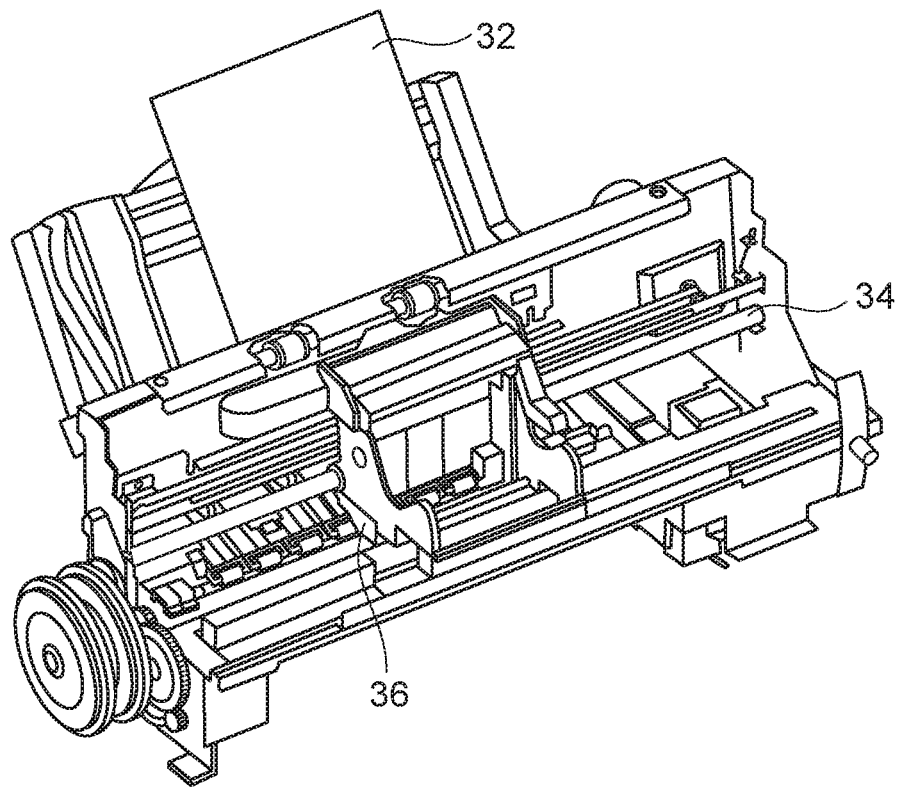
FIG. 1A is a schematic perspective view of a relevant portion of an example of a recording apparatus used in an ink jet recording method according to the present disclosure.

The present disclosure will now be described in further detail through preferable embodiments. In the present disclosure, an aqueous ink may be referred to simply as an "ink". The physical property values are values at normal temperature (25° C.) unless otherwise noted.

Regarding the image obtained by the ink jet recording method described in Japanese Patent Laid-Open No. 2015-193126, the inventors of the present disclosure have investigated the cause of insufficient color developability and insufficient glossiness after storage. A typical recording medium having an ink receiving layer uses a cationic compound to increase the water resistance and the like of the image to be recorded. The cationic compound is often used in a hydrochloride salt form. Thus, the ink receiving layer contains a chloride ion. The studies by the inventors of the present disclosure have found that, when the chloride ion content in the ink receiving layer is low, an image in which the color tone of the ink applied after the ink containing a silver particle is applied is easily recognizable could not be obtained. In this description, a metallic image in which the color tone of the ink containing a coloring material is recognizable is hereinafter referred to as an image having "color developability".

First, an ink containing a silver particle and an ink containing a coloring material are sequentially applied one over the other to a recording medium having an ink receiving layer having a low chloride ion content to record an image. Analysis of the obtained image has found that because most of silver particles do not fuse with surrounding silver particles, an even silver layer is not formed and, thus, the coloring material does not remain on the silver layer. The reason for this is presumed as follows. When an ink containing a coloring material is applied in a state in which the silver particles are not fused, the silver particles disperse and move into the liquid component in the ink containing a coloring material. The silver layer in such a state cannot cause the coloring material to remain and thus the color developability is not exhibited.

To address this, an ink containing a silver particle and an ink containing a coloring material are sequentially applied one over the other to a recording medium having an ink receiving layer having a high chloride ion content to record an image. Analysis of the obtained image has found that a silver layer in a state in which most of silver particles are fused with surrounding silver particles is formed and the coloring material remains on the silver layer. The reason for this is presumed as follows. When enough chloride ions are present in the ink receiving layer, some of the ionized silver ions in the silver particle and chloride ions react with each other to form silver chloride. The thus-formed silver chloride serves as a nucleus that promotes fusing of silver particles and thus an even silver layer is formed. Unlike the case described above, the silver particles rarely disperse into the liquid component in the ink containing a coloring material even when the ink containing a coloring material is applied to the silver layer in the state in which silver particles are fused. It is considered that because of such a state of the silver layer, the coloring material can remain, and the color developability is exhibited.

However, according to the studies conducted by the innovators of the present disclosure, it has been found that when an image recorded on a recording medium having an ink receiving layer having a high chloride ion content is stored, the glossiness is gradually degraded and thus the metallic appearance is lost with passage of time. The reason for this is presumed as follows. When an image is exposed to oxidizing gas, such as nitrogen oxide, or light, a silver atom constituting the silver layer is activated and turns into a silver ion. The silver ion generated thereby reacts with a chloride ion to generate silver chloride. In this manner, while the image is stored, silver chloride is gradually generated and, when silver chloride more than enough to maintain the fusion of the silver particles is generated, whitening and discoloration occur due to silver chloride, thereby resulting in degradation of glossiness of the image.

In other words, although the chloride ion can cause the color metallic image to exhibit color developability as long as the chloride ion content in the ink receiving layer is high, the chloride ion is a factor that causes degradation of glossiness. Thus, in order to achieve both the color developability and suppression of degradation of gloss after storage, it is necessary to promote fusion of silver particles despite the low chloride ion content in the ink receiving layer. Under this presumption, the inventors of the present disclosure have conducted studies and found that a particular amount of a halide ion selected from the group consisting of a bromide ion and an iodide ion may be contained in the ink receiving layer.

Effectiveness of the bromide ion and the iodide ion is explained through the solubility product of a silver halide. The solubility product $K_{sp}$ is a product of the cation concentration and the anion concentration in a saturated aqueous solution of a sparingly soluble substance. When the product of the ion concentrations is more than the solubility product $K_{sp}$, precipitates of a silver halide are generated. The solubility products of various silver halides at 25° C. are as follows. The solubility products described below indicate that, when a particular amount of a silver ion is present, less bromide ions or iodide ions are required to generate the same amount of a halide silver compared to chloride ions,
Solubility product of silver chloride=$1.6 \times 10^{-1} (mol/L)^2$
Solubility product of silver bromide=$4.0 \times 10^{-13} (mol/L)^2$
Solubility product of silver iodide=$8.5 \times 10^{-17} (mol/L)^2$ In the present disclosure, a recording medium having an ink receiving layer that contains a halide ion selected from the group consisting of a bromide ion and an iodide ion, which require smaller air amounts to generate a silver halide, is used. In addition, the halide ion content (mmol/m$^2$) needs to be 0.1 mmol/m$^2$ or more to 0.8 mmol/m$^2$ or less. When the halide ion content is less than 0.1 mmol/m$^2$, the amount of the halide ion is too small to promote fusion of silver particles and the image does not exhibit color developability. Meanwhile, when the halide ion content is more than 0.8 mmol/m$^2$, the amount of the halide ion is too large and thus, crystals of a silver halide occur excessively during storage of the image, resulting in whitening and discoloration, and thus degradation of the glossiness after storage of the image cannot be suppressed.

Recording Method and Recording Apparatus

In the recording method of the present disclosure, a first ink, which is an aqueous ink containing a silver particle, a second ink, which is an aqueous ink containing a coloring material, and a recording medium in which an ink receiving layer containing a particular amount of a halide ion (bromide ion or iodide ion) is formed are used. In addition, a step of applying the first ink to the recording medium and a step of recording an image on the recording medium by applying the second ink so that the second ink at least partially overlaps a region to which the first ink has been applied are performed. A recording apparatus of the present disclosure includes a unit that, after application of the first ink to a recording medium, records an image on the recording medium by applying the second ink so that the second ink at least partially overlaps a region to which the first ink has been applied.

The recording method of the present disclosure can be an ink jet recording method that uses an ink jet recording apparatus equipped with an ink jet recording head. In other words, the first ink and the second ink can be ejected from an ink jet recording head and applied to the recording medium. Examples of the ink ejection system include a system with which mechanical energy is applied to the ink and a system with which thermal energy is applied to the ink. In the present disclosure, a system with which thermal energy is applied to the ink to eject ink can be employed.

In the recording method of the present disclosure, it is not necessary to perform a step of applying an active energy ray, such as a UV ray or an electron beam. Moreover, in the recording method of the present disclosure, a treatment liquid containing a functional material and the like may be applied to the recording medium before the first ink and the second ink. However, as long as the aforementioned recording medium is used, there is usually no need to perform a step of applying a treatment liquid different from the first ink and the second ink. Thus, at least the first ink can be applied to the recording medium in a dry state (state in which water is virtually not contained), not in a wet state (state in which water is virtually contained) created by application of a different aqueous treatment liquid in advance.

Figure 1B:
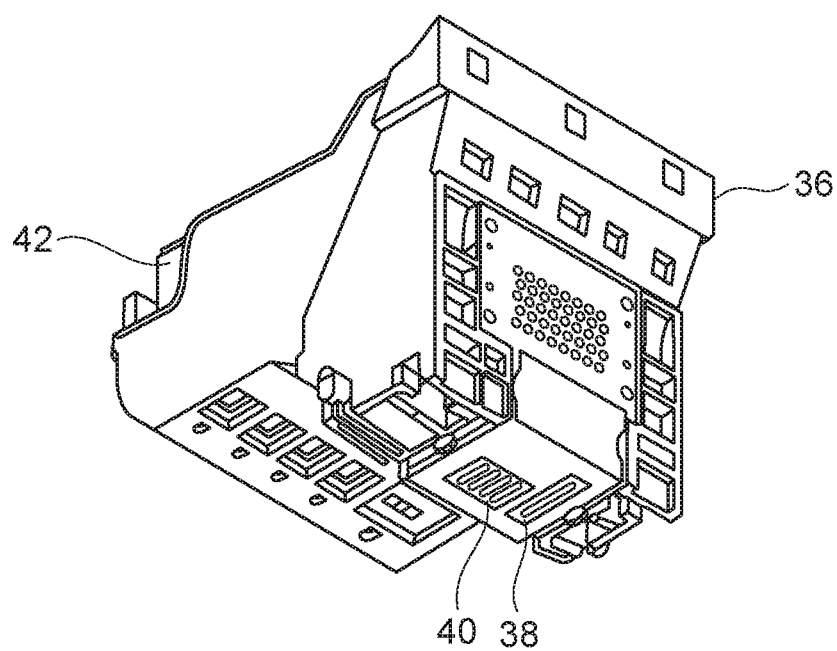
FIG. 1B is a perspective view of a head cartridge, according to one or more element of the subject disclosure.

FIG. 1A is a schematic perspective view of a relevant portion of an example of an ink jet recording apparatus used in an ink jet recording method of the present disclosure and FIG. 1B is a perspective view of a head cartridge. The ink jet recording apparatus includes a conveying unit (not illustrated) that conveys a recording medium 32, and a carriage shaft 34. A head cartridge 36 can be mounted onto the carriage shaft 34. The head cartridge 36 is equipped with recording heads 38 and 40 and is configured to fit an ink cartridge 42. While the head cartridge 36 is conveyed in the main scanning direction along the carriage shaft 34, inks (not illustrated) are ejected from the recording heads 38 and 40 toward the recording medium 32. As the recording medium 32 is conveyed in the sub scanning direction by the conveying unit (not illustrated), an image is recorded on the recording medium 32.

First Ink

The first ink is an aqueous ink containing a silver particle. The first ink can be used for ink jet. However, since the first ink does not have to be of an active energy ray curable type, there is no need to contain a monomer having a polymerizable group and the like. The components constituting the first ink are described below.

Silver Particle

A silver particle is composed of silver atoms. The silver particle may contain, in addition to silver atoms, other metal atoms, oxygen atoms, sulfur atoms, carbon atoms and the like. The proportion %) of the silver atoms in the silver particle can be 50.0% by mass or more. The silver particle content (% by mass) in the first ink with respect to the total mass of the ink can be 2,0% by mass or more to 15.0% by mass or less.

The volume-based cumulative 50% particle size of the silver particle measured by a dynamic light scattering method is preferably 200 nm or less and more preferably 150 nm or less. The volume-based cumulative 50% particle size of the silver particle refers to a particle diameter at which the volume cumulated from the small particle diameter side reaches 50% with respect to the total volume of the silver particles in a particle size cumulative curve. When the cumulative 50% particle size is small, the proportion of the silver atoms present in the surfaces of the silver particles with respect to the total number of the silver atoms per unit mass is increased and this means that there are many silver atoms that can easily move in the silver particles. When the proportion of the silver atoms that can easily move in the silver particles is increased, silver atoms present in a surface of a particular silver particle can easily form metal bonds with silver atoms present in surfaces of nearby silver particles, and thus fusion of silver particles easily occurs. As a result, the coloring material is likely to remain on the silver layer and thus the color developability of the image tends to improve. The cumulative 50% particle size is preferably 1 nm or more and more preferably 10 nm or more.

The volume-based cumulative 50% particle size of the silver particles is measured as follows by using a sample prepared by diluting the first ink or a dispersion liquid of a silver particle with water. After the sample is applied to a substrate formed of a silicone material, water is removed to prepare a sample. By using the obtained sample, 3,000 or more silver particles are observed with a scanning electron microscope (SEM), a transmission electron microscope (TEM) or the like and image processing is performed to calculate the particle size having the aforementioned definition. In the examples described below, after the silver particles were observed, the particle size was calculated by using an image analyzer/measurement software (trade name: "Win:ROOF:2015" produced by Mitani Corporation). The particle size of the silver particle can be measured by a dynamic light scattering method using the ink or dispersion liquid; however, since the measurement value tends to fluctuate due to the influence of fusion and the like, the measurement can be performed on a sample diluted with water as described above.

Examples of the method for producing the silver particle include a method involving crushing a silver block with a crusher such as a ball mill or a jet mill (crushing method) and a method involving aggregating a silver ion or a silver complex by reduction using a general purpose reducing agent (reduction method). In the present disclosure, from the viewpoint of controlling the particle size of the silver particle and dispersion stability of the silver particle, a silver particle produced by the reduction method can be used.

The silver particle can be dispersed by using a surfactant or a dispersant such as a resin, and used. The dispersant content (% by mass) in the aqueous ink with respect to the total mass of the ink can be 0.1% by mass or more to 5.0% by mass or less. The mass ratio of the dispersant content. (% by mass) to the silver particle content (% by mass) in the aqueous ink can be 0.2 times or more to 1.5 times or less.

Examples of the dispersant for the silver particle include various surfactants such as an anionic surfactant, a nonionic surfactant, a cationic surfactant and an amphoteric surfactant. Examples of the anionic surfactant include a fatty acid salt, an alkyl sulfate ester salt, an alkyl aryl sulfonate, an alkyl diaryl ether disulfonate, a dialkyl sulfosuccinate, an alkyl phosphate, a naphthalene sulfonate formalin condensate, a polyoxyethylene alkyl ether sulfate, a polyoxyethylene alkyl phosphate ester salt and a glycerol borate fatty acid ester. Examples of the nonionic surfactant include polyoxyethylene alkyl ether, a polyoxyethylene oxypropylene block copolymer, sorbitan fatty acid ester, glycerin fatty acid ester, polyoxyethylene fatty acid ester, polyoxyethylene alkyl amine, a fluorine-based compound and a silicone-based compound. Examples of the cationic surfactant include an alkyl amine salt, a quaternary ammonium salt, an alkylpyridinium salt and an alkylimidazolium salt. Examples of the amphoteric surfactant include alkylamine oxide and phosphatidylcholine.

A resin that has a unit having an anionic group and a unit that does not have an anionic group can be used as the dispersant for the silver particle. Examples of the resin skeleton include a vinyl resin, an ester resin, an amino resin, an acrylic resin, an epoxy resin, a urethane resin, an ether resin, an amide resin, a phenolic resin, a silicone resin, resin and a fluororesin.

Aqueous Medium

The first ink is an aqueous ink containing at least water as the aqueous medium. The first ink can contain water or an aqueous medium, which is a mixed medium containing water and a water-soluble organic solvent. Water can be deionized. water or ion exchange water. The water content (% by mass) in the first ink with respect to the total mass of the ink can be 50.0% by mass or more to 95.0% by mass or less. The water-soluble organic solvent may be any as long as it is water-soluble and an alcohol, a (poly)alkylene glycol, a glycol ether, a nitrogen-containing polar solvent, a sulfur-containing polar solvent etc., can be used. The water-soluble organic solvent content (% by mass) in the first ink with respect to the total mass of the ink can be 3.0% by mass or more to 50.0% by mass or less. When the first ink is used in the ink jet recording method and the water-soluble organic solvent content is outside the range described above, reliability such as sticking resistance, ejection stability and the like is moderately degraded.

Surfactant

The first ink can further contain another surfactant in addition to the surfactant that can be used as the dispersant for the silver particle. In the first ink, the content (% by mass) of the surfactant other than the surfactant used as the dispersant for the silver particle with respect to the total mass of the ink can be 0.1% by mass or more to 2.0% by mass or less. Examples of the surfactant include an anionic surfactant, a nonionic surfactant, a cationic surfactant and an amphoteric surfactant. Among these, a nonionic surfactant such as an ethylene oxide adduct of acetylene glycol or polyoxyethylene alkyl ether is preferable.

Other Additives

The first ink may contain, in addition to the components described above, a water-soluble organic compound that is solid at 25° C. such as a urea or a derivative thereof, trimethylolpropane or trimethylol ethane. Furthermore, the first ink may contain, in addition to the components described above and as needed, various additives such as defoaming agent, a pH adjuster, an antirust agent, a preservative, an antifungal agent, an antioxidant, a reducing inhibitor and a chelating agent.

Physical Properties of Ink

The viscosity (mPa·s) of the first ink at 25° C. is preferably 1 mPa·s or more to 6 mPa·s or less and more preferably 1 mPa·s or more to 4 mPa·s or less. The surface tension (mN/m) of the first ink at 25° C. is preferably 10 mN/m or more to 60 mN/m or less, more preferably 20 mN/m or more to 50 mN/m or less and yet more preferably 25 mN/m or more to 40 mN/m or less.

Second Ink

The second ink is an aqueous ink containing a coloring material. The second ink can be used for ink jet. However, since the second ink does not have to be of an active energy ray curable type, there is no need to contain a monomer having a polymerizable group and the like. The components constituting the second ink are described below.

Coloring Material

Examples of the coloring material include a dye and a pigment. The coloring material content (% by mass) in the second ink with respect to the total mass of the ink is preferably 1.0% by mass or more to 10.0% by mass or less and more preferably 2.0% by mass or more to 8.0% by mass or less.

The dye can be an anionic dye. The dye can be a compound having at least one skeleton selected from the group consisting of an azo skeleton, a phthalocyanine skeleton, an anthrapyridone skeleton and a xanthene skeleton. Examples of the pigment include inorganic pigments such as carbon black and titanium oxide; and organic pigments such as azo, phthalocyanine, quinacridone, isoindolinone, imidazolone, diketopyrrotopyrrole and dioxazine. Examples of the pigment dispersion system include a resin-dispersed pigment that uses a resin as a dispersant and a self-dispersible pigment in which a hydrophilic group is bonded to a particle surface of a pigment. A resin-bonding-type pigment in which a resin is chemically bonded to a particle surface of a pigment or a microcapsule pigment in which a particle surface of a pigment is coated with a resin or the like can be used, for example. The coloring material can be a dye or a resin-dispersed pigment that uses a resin dispersant.

Aqueous Medium

The second ink is an aqueous ink containing at least water as the aqueous medium. The second ink can contain water or an aqueous medium, which is a mixed medium containing water and a water-soluble organic solvent. Water can be deionized water or ion exchange water. The water content (% by mass) in the second ink with respect to the total mass of the ink can be 50.0% by mass or more to 95.0% by mass or less. The water-soluble organic solvent may be any as long as it is water-soluble, and an alcohol, a (poly)alkylene glycol, a glycol ether, a nitrogen-containing polar solvent, a sulfur-containing polar solvent etc., can be used. The water-soluble organic solvent content (% by mass) in the second ink with respect to the total mass of the ink can be 3.0% by mass or more to 50.0% by mass or less. When the second ink is used in the ink jet recording method and the water-soluble organic solvent content is outside the range described above, reliability such as sticking resistance, ejection stability and the like is moderately degraded.

Other Components

The second ink may contain, in addition to the components described above, a water-soluble organic compound that is solid at 25° C. such as urea or a derivative thereof, trimethylolpropane or trimethylol ethane. Furthermore, the second ink may contain, in addition to the components described above and as needed, various additives such as a surfactant, a defoaming agent, a pH adjuster, an antirust agent, a preservative, an antifungal agent, an antioxidant, a reducing inhibitor and a chelating agent.

Physical Properties of Ink

The viscosity (mPa·s) of the second ink at 25° C. is preferably 1 mPa·s or more to 6 mPa·s or less and more preferably 1 mPa·s or more to 4 mPa·s or less. The surface tension (mN/m) of the second ink at 25° C. is preferably 10 mN/m or more to 60 mN/m or less, more preferably 20 mN/m or more to 50 mN/m or less, and yet more preferably 25 mN/m or more to 40 mN/m or less.

Recording Medium

The recording medium has an ink receiving layer that contains a particular halide ion. The ink receiving layer is usually disposed on a substrate. The structure of the recording medium is described below.

Substrate

The substrate may be any article that has at least one surface on which an ink receiving layer can be formed, and an example of the substrate is a sheet of paper. Specific examples of paper include synthetic paper formed of a resin or the like and paper formed of pulp. Paper made from wood pulp as the main raw material and obtained by adding, as needed, synthetic pulp, such as polypropylene, or a synthetic fiber, such as nylon or polyester, is one example of the paper. Examples of the wood pulp include leaf bleached kraft pulp (LBKP) and needle bleached kraft pulp (NBKP). Pulp can be chlorine-free pulp, such as non-chlorine bleached pulp (elemental chlorine free (ECF) and totally chlorine free (TCF)). The thickness (μm) of the substrate can be 50 μm or more to 400 μm or less.

A resin layer may be formed on the substrate. The resin layer may be formed on only one of the surfaces of the substrate or both of the surfaces of the substrate. Examples of the resin forming the resin layer include a thermoplastic resin such as an acrylic resin, an acryl silicone resin, an olefin resin or a styrene-butadiene copolymer, and among these, an olefin resin is preferable. Examples of the olefin resin include polyethylene, polypropylene and polyisobutylene and, among these, polyethylene is preferable. Polyethylene can be low-density polyethylene (LDPE) or high-density polyethylene (HDPE). In order to adjust opacity whiteness, hue and the like, additives such as a white pigment, a fluorescent brightening agent, ultramarine and the like may be added to the resin for forming the resin layer. In order to increase opacity, a white pigment such as titanium oxide can be contained. The white pigment content (% by mass) in the resin layer with respect to the total mass of the resin layer can be more than 0.0% by mass to 25.0% by mass or less.

Ink Receiving Layer

The ink receiving layer is required to contain a halide ion selected from the group consisting of a bromide ion and an iodide ion and to have a halide ion content of 0.1 mmol/m$^2$ or more to 0.8 mmol/m$^2$ or less. One ink receiving layer or two or more ink receiving layers may be provided; and when there are two or more ink receiving layers, the ink receiving layer farthest from the substrate can have the structure described above. The ink receiving layer may be formed on only one of the surfaces of the substrate or both of the surfaces of the substrate.

An example of the technique for causing the ink receiving layer to contain a halide ion selected from the group consisting of a bromide ion and an iodide ion is a technique involving use of a water-soluble metal halide. Specifically, a bromide or an iodide of an alkali metal or an alkaline earth metal can be used. Examples of the alkali metal include lithium, sodium and potassium and examples of the alkaline earth metal include magnesium and calcium. A bromide or iodide of an alkali metal can be used since it has better solubility in water. Although the effects of the present disclosure can be obtained from both the bromide ion and the iodide ion, the bromide ion is preferable from the viewpoint of the whiteness of the ink receiving layer.

The content (mmol/m$^2$) the halide ion selected from the group consisting of a bromide ion and an iodide ion in the ink receiving layer is 0.1 mmol/m$^2$ or more to 0.8 mmol/m$^2$ or less. The content can be 0.3 mmol/m$^2$ or more to 0.7 mmol/m$^2$ or less. In the present disclosure, the ink receiving layer may be free of a chloride ion. When a chloride ion is used, from the viewpoint of suppressing degradation of gloss after storage, the chloride ion content (mmol/m²) in the ink receiving layer is preferably 0.5 mmol/m² or less and more preferably 0.1 mmol/m² or less. Particularly preferably, the ink receiving layer is free of a chloride ion.

The halide ion content in the ink receiving layer can be determined by ion chromatography. Specifically, 10 mL of ion exchange water is placed in a 20 mL vial (diameter: φ16 mm) and a lid is placed so that the ink receiving layer-side of the recording medium is in contact with the content of the vial and the vial is fixed so that the ion exchange water does not leak. Subsequently, the vial is put upside down and is left to stand still in a 25° C. environment for 24 hours. In this manner, the ink receiving layer comes into contact with water and the halide ion is extracted. The obtained extracted liquid is used to quantitively analyze the anion by ion chromatography so as to determine the halide ion content in the ink receiving layer. In this description, the halide ion content is indicated by millimoles per unit area of the ink receiving layer.

Cationic Resin

Unlike a pigment that has a particle size and in a dispersed state in the ink, the dye in the ink is in a dissolved state. Thus, compared to a pigment, it is difficult to make a dye to remain on the silver layer, and the color developability tends to be relatively low. When an anionic dye is used as the coloring material in the second ink, an ink receiving layer containing a cationic resin can be used. When the second ink is applied to the silver layer formed on a recording medium, at least part of the cationic resin in the ink receiving layer dissolves in the liquid component in the second ink. Part of the dissolved cationic resin passes through pores in the silver layer and bleeds out on the surface of the silver layer (the surface to which the second ink is applied) or the vicinity thereof. The bleed-out cationic resin reacts with the anionic group in the dye and this causes smooth precipitation of the dye and causes the dye to remain on the silver layer; thus, even when a dye is used, degradation of the color developability of the image can be effectively suppressed.

An example of the cationic resin is a resin having an amine structure or the like and the resin may be in a salt form. Amine may be any of primary to quaternary amines. The cationic resin can be a resin having a nitrate-salt-type or sulfate-salt-type amine structure. Examples of the nitrate salt of the resin having an amine structure include a polyallylamine nitrate salt and a nitrate salt of a dicyandiamide/diethylene triamine resin. Examples of the sulfate salt of the resin having an amine structure include a polyallylamine sulfate salt and a sulfate salt of a dicyandiamide/diethylene triamine resin. The weight-average molecular weight of the cationic resin can be 1,000 or more to 100,000 or less. The amine value of the cationic resin can be 50 mgKOH/g or more to 300 mgKOH/g or less.

The cationic resin content (g/m²) in the ink receiving layer can be 0.2 g/m² or more to 5.0 g/m² or less. When the content is less than 0.2 g/m², the amount of the cationic resin is excessively small and precipitation of the dye does not smoothly occur; thus, the effect of suppressing degradation of the color developability of the image may not be sufficiently obtained. When the content is more than 5.0 g/m², the amount of the cationic resin is excessively large and the ink absorbability of the ink receiving layer tends to decrease, the liquid component of the ink remains in the ink receiving layer and precipitation of the dye in the ink does not smoothly occur. As a result, the dye rarely remains on the silver layer and the effect of suppressing degradation of the color developability of the image may not be sufficiently obtained. The cationic resin content (g/m²) in the ink receiving layer is more preferably 0.6 g/m² or more to 3.0 g/m² or less.

Antirust Agent and Antioxidant

The ink receiving layer can contain at least one of an antirust agent and an antioxidant. When the ink receiving layer contains the antirust agent or the antioxidant, ionization of a silver particle by oxidizing gas such as nitrogen oxide or light can be suppressed. As a result, a silver halide is rarely formed and degradation of glossiness after storing the image can be more effectively suppressed.

The antirust agent can be 1,2,3-benzotriazole or a derivative thereof. Examples of the derivative of 1,2,3-benzotriazolk include 1-(methoxymethyl)-1H-benzotriazole and 1-(hydroxymethyl)-1H-benzotriazole. The antirust agent content (g/m²) in the ink receiving layer can be 0.02 g/m² or more to 0.15 g/m² or less.

The antioxidant can be ascorbic acid or a salt thereof. Examples of the cation forming a salt of ascorbic acid include ions of alkali metals such as lithium, sodium and potassium and ions of alkaline earth metals such as magnesium and calcium. The antioxidant content (g/m²) in the ink receiving layer can be 0.05 g/m² or more to 0.25 g/m² or less.

Inorganic Particle

The ink receiving layer can contain an inorganic particle. Examples of the inorganic particle include alumina hydrate, alumina, silica, colloidal silica and titanium dioxide. The inorganic particle can be alumina hydrate, alumina or silica since a porous structure with high ink absorbability can be formed. Alumina hydrate, alumina and silica may be used in combination. The inorganic particle content (% by mass) in the ink receiving layer with respect to the total mass of the ink receiving layer is preferably 50.0% by mass or more to 98.0% by mass or less and more preferably 70.0% by mass or more to 96.0% by mass or less.

Examples of alumina hydrate include boehmite-type alumina hydrate and amorphous alumina hydrate. Examples of alumina include fumed alumina such as γ-alumina, α-alumina, δ-alumina, θ-alumina and χ-alumina. Among these, γ-alumina is preferable from the viewpoints of optical density of the image and the ink absorbability.

Alumina hydrate and alumina can be dispersed by using a dispersant so as to be in a dispersed state in a coating liquid (hereinafter may be referred to as a "first coating liquid") for forming the ink receiving layer. The dispersant can be an acid, and, in particular, a compound represented by R-SO₃H from the viewpoint of suppressing image blur. In the formula, R represents a hydrogen atom, an alkyl group having 1 or more to 4 or less carbon atoms or an alkenyl group having 2 or more to 4 of less carbon atoms. R may be substituted with an oxo group, a halogen atom, an alkoxy group or an acyl group. A specific example of the aforementioned compound is methanesulfonic acid. The acid content with respect to the alumina hydrate or alumina content is preferably 1.0% by mass or more to 2.0% by mass or less and more preferably 1.3% by mass or more to 1.6% by mass or less.

Silica is roughly categorized into those formed by a wet process and those formed by a dry process (vapor phase method). A wet process involves generating activated silica by acid decomposition of a silicate, polymerizing the activated silica to an appropriate degree, and inducing precipitation to obtain "hydrous silica". A dry process (vapor phase method) involves obtaining "anhydrous silica" through a method involving high-temperature vapor phase hydrolysis of silicon halide (flame hydrolysis method) or a method involving heating, reducing and vaporizing silica sand and coke in an electric furnace using an arc so as to perform oxidization with air (arc method). Of these, fumed silica obtained by a dry process (vapor phase method) is preferably used. Fumed silica has a large specific surface area and excellent ink absorbability as well as low refractive index, and can form a transparent ink receiving layer; thus, fumed silica is preferable from the viewpoint of the color developability of the image.

The average primary particle size of the inorganic particle is preferably 150 nm or less, more preferably 1 nm or more to 100 nm or less, and yet more preferably 3 nm or more to 30 nm or less. The average primary particle size of the inorganic particle is a number-average particle size determined from the diameters of circles having the same area as the projected areas of primary particles of the inorganic particles under observation with an electron microscope. The measurement is conducted on one hundred or more particles.

As described above, the inorganic particle can be dispersed in the first coating liquid by the dispersant and used. The average secondary particle size of the inorganic particle in the first coating liquid is preferably 1 nm or more to 500 nm or less, more preferably 1 nm or more to 300 nm or less and yet more preferably 10 nm or more to 250 nm or less. The average secondary particle size of the inorganic particle is a volume-based cumulative 50% particle size measured by a dynamic light scattering method.

The coating amount (g/m$^2$) of the inorganic particle applied to the substrate when forming the ink receiving layer can be 8 g/m$^2$ or more to 45 g/m$^2$ or less. In this range, the ink receiving layer is likely to have a desirable thickness. The coating amount of the inorganic particle can be adjusted by the inorganic particle content in the first coating liquid and the coating amount of the first coating liquid.

Binder

The ink receiving layer can contain a binder to bond the inorganic particle and form a film. Examples of the binder include a polymer canonized by using a cationic group; a polymer having a surface canonized by using a cationic surfactant; a polymer obtained by polymerizing a monomer that constitutes the polymer in the presence of a cationic polyvinyl alcohol so that polyvinyl alcohol is distributed over the surface of the polymer; a polymer obtained by polymerizing a monomer constituting a polymer in a suspension dispersion liquid of a cationic colloid particle so that the cationic colloid particle is distributed over the surface of the polymer; an aqueous binder such as a thermosetting synthetic resin, e.g., a melamine resin or a urea resin; and a synthetic resin such as a polymer or copolymer of an acrylic acid ester or a methacrylic acid ester, such as poly methyl methacrylate.

Among the aforementioned binders, polyvinyl alcohol or a derivative thereof (hereinafter may also be referred to as "a polyvinyl alcohol compound") capable of forming a transparent film is preferably used. Examples of the derivative of polyvinyl alcohol include a cation-modified polyvinyl alcohol, an anion-modified polyvinyl alcohol, a silanol-modified polyvinyl alcohol and polyvinyl acetal.

From the viewpoint of the ink absorbability, the mass ratio of the binder content (% by mass) in the ink receiving layer to the inorganic particle content (% by mass) is preferably 0.50 times or less and more preferably 0.30 times or less. From the viewpoint of binding-ability of the inorganic particle, the aforementioned mass ratio is preferably 0.05 times or more and more preferably 0.08 times or more.

When preparing the first coating liquid, a polyvinyl alcohol compound can be used as an aqueous solution. The polyvinyl alcohol compound content (solid content, mass %) in the first coating liquid with respect to the total mass of the first coating liquid can be 3.0% by mass or more to 20.0% by mass or less.

Crosslinking Agent

The ink receiving layer can contain a crosslinking agent to improve water resistance. Examples of the crosslinking agent include a zirconium-based compound, an amide-based compound, an aluminum-based compound and boric acids. In particular, when a polyvinyl alcohol compound is used as the binder, a boric acid can be used. Since a polyvinyl alcohol compound has many hydroxy groups and is highly hydrophilic, the hydroxy groups react with water in the ink, and the ink receiving layer is likely to expand. As a result, the ink absorbability of the ink receiving layer tends to be degraded. Even when a polyvinyl alcohol compound is contained in the ink receiving layer, presence of a crosslinking agent causes the hydroxy groups to selectively react with the crosslinking agent; thus, expansion of the ink receiving layer is suppressed, and degradation of the ink absorbability can be suppressed.

Examples of a boric acid include orthoboric acid ($H_3BO_3$), metaboric acid and diboric acid. The boric acid may be in a salt form and can be a water-soluble salt. Examples include an alkali metal salt of boric acid such as a sodium salt or potassium salt; an alkaline earth metal salt of boric acid, such as a magnesium salt or a calcium salt; and an ammonium salt of boric acid. From the viewpoint of stability of the first coating liquid over time and suppressing cracks, orthoboric acid can be used.

When the ink receiving layer contains a polyvinyl alcohol compound and a crosslinking agent, theoretically, assuming that the amount of the crosslinking agent that can react with hydroxy groups in the polyvinyl alcohol compound without excess or deficiency is 1.00 equivalent, the following condition can be satisfied. The crosslinking agent content in the ink receiving layer with respect to the polyvinyl alcohol compound content can be 0.10 equivalents or more to 1.20 equivalents or less. Within this range, the reaction between the polyvinyl alcohol compound and the crosslinking agent proceeds sufficiently, and thus the color developability and the glossiness of the image can be improved in a well balanced manner. The amount of the crosslinking agent used can be appropriately adjusted according to the production conditions and the like. The crosslinking agent content in the ink receiving layer with respect to the binder content is preferably 1.0% by mass or more to 50,0% by mass or less and more preferably 5.0% by mass or more to 40.0% by mass or less.

Other Components

The ink receiving layer may contain, in addition to the components described above and as needed, various additives such as a pH adjuster, a thickener, a releasing agent, a fluorescent brightening agent, an ultraviolet absorber, a preservative, an antifungal agent, a water resistant agent and a curing agent.

Paper Surface pH

The paper surface pH of the recording medium can be 6.0 or less. The paper surface pH of the recording medium is the pH of the ink receiving layer, and can be measured in accordance with JAPAN TAPPI No. 49-1 "Paper and Board—Surface pH Testing Method—Part 1: Glass Electrode Method".

Method for Producing Recording Medium

The recording medium used in the present disclosure may be produced by any method as long as the method is capable of forming an ink receiving layer that contains a particular halide ion in an amount within a particular range. Specifically, the following methods (i) and (ii) can be used to produce the recording medium. Here, the case in which a metal halide is used as a compound that can generate a particular halide ion is described as an example. The antirust agent and the antioxidant may be contained in any one of the first coating liquid and the second coating liquid.

(i) A method involving applying a first coating liquid containing a metal halide, an inorganic particle etc., to a substrate.

(ii) A method involving applying a first coating liquid containing an inorganic particle etc., to a substrate, and then applying a separate second coating liquid containing a metal halide etc., to the substrate.

The method (i) involves forming an ink receiving layer by a single application step. According to the method (ii), after a porous layer is formed by applying the first coating liquid, the second coating liquid is applied to cause the particular halide ion to exist in the porous layer so as to form an ink receiving layer. When the method (ii) is used, after the first coating liquid is applied to the substrate and before the second coating liquid is applied, the first coating liquid may be dried as needed. Which of these methods is to be employed can be determined according to the type of the production apparatus, productivity and the like.

The coating liquids can be applied to the substrate by using a curtain coater, an extrusion-system coater, a slide hopper-system coater or the like. During application, the coating liquids may be heated. Examples of the drying method include a method that uses a hot air dryer, such as a straight tunnel dryer, an arch dryer, an air loop dryer, a sine curve air float dryer or the like, and a method that uses a dryer that utilizes an infrared ray, a heating dryer, a microwave or the like.

Recorded Matter

A recorded matter of the present disclosure includes an ink receiving layer, a first layer adjacent to the ink receiving layer and a second layer adjacent to the first layer. The ink receiving layer contains a halide ion selected from the group consisting of a bromide ion and an iodide ion and has a halide ion content (mmol/m$^2$ of 0.1 mmol/m$^2$ or more to 0.8 mmol/m$^2$ or less. The first layer is formed of silver and the second layer is formed of a coloring material. The recorded matter having such a structure can be prepared by the recording method of the present disclosure described above. As described above, the recorded matter of the present disclosure has excellent color developability and excellent glossiness even after the recorded matter is stored.

EXAMPLES

The present disclosure will now be described in further detail through Examples and Comparative Examples below; however, these examples do not limit the present disclosure without departing from the gist thereof. The "parts" and "%" indicating the amounts of components are on a mass basis unless otherwise noted.

Preparation of Silver Particle Dispersion Liquid

Silver particle dispersion liquids 1 to 3 were prepared by referring to the description of Example 2 in PCT Japanese Translation Patent Publication No. 2010-507727. During the preparation, the particle size was adjusted by adjusting the agitation speed. The silver particle content in each dispersion liquid was 20.0% and the resin content was 2.0%. The volume-based cumulative 50% particle size of the silver particle was 32 nm in dispersion liquid 1, 150 nm in dispersion liquid 2 and 160 nm in dispersion liquid 3. The volume-based cumulative 50% particle size of the silver particle was measured by the following procedure. First, a dispersion liquid diluted about 2,000 fold (on a mass basis) with ion exchange water was applied to a substrate formed of a silicone material, and water was removed by drying to prepare a sample. Next, by using the obtained sample, 3,000 or more silver particles were observed with a scanning electron microscope and image analysis was performed with image analysis/measurement software (trade name: "WinROOF2015" produced by MITANI Corporation) to calculate the cumulative 50% particle size of the silver particle.

Preparation of First Ink

Components (unit: %) indicated in Table 1 were mixed, thoroughly agitated and pressure-filtered with a filter having a pore size of 1.2 and a first ink was obtained as a result. Acetylenol E100 is trade name of a nonionic surfactant produced by Kawaken Fine Chemicals Co., Ltd.

TABLE 1

| Composition of first ink (unit: %) | | | |
|---|---|---|---|
| | First ink | | |
| | 1 | 2 | 3 |
| Silver particle dispersion liquid 1 | 50.0 | | |
| Silver particle dispersion liquid 2 | | 50.0 | |
| Silver particle dispersion liquid 3 | | | 50.0 |
| Ethylene glycol | 20.0 | 20.0 | 20.0 |
| Acetylenol E100 | 0.2 | 0.2 | 0.2 |
| Ion exchange water | 29.8 | 29.8 | 29.8 |

Preparation of Coloring Material
Pigment Dispersion Liquid 1

A mixture was obtained by mixing 10.0 parts of a pigment (C.I. Pigment Red 122), 30.0 parts of an aqueous solution of a resin dispersant and 60.0 parts of ion exchange water. An aqueous solution having a water-soluble resin content of 10.0% was prepared by neutralizing a styrene-acrylic acid copolymer having an acid value of 120 mgKOH/g and a weight-average molecular weight of 8,000 with an amount of potassium hydroxide equimolar to the acid value and then dissolving the neutralized product in ion exchange water, and was used as the aqueous solution of the resin dispersant. The obtained mixture and 200 parts of zirconia beads having a diameter of 0.3 mm were placed in a batch-type vertical sand mitt (produced by AIMEX CO., Ltd.) and were dispersed for 5 hours under water cooling. Subsequently, a coarse particle was removed by centrifugal separation. The resulting mixture was pressure-filtered with a cellulose acetate filter having a pore size of 3.0 μm (produced by Advantech Co., Ltd.) to prepare pigment dispersion liquid 1 having a pigment content of 10.0% and a resin dispersant content of 3.0%.

Pigment Dispersion Liquid 2

Pigment dispersion liquid 2 having a pigment content of 10.0% and a resin dispersant content of 3.0% was prepared by the same procedure as pigment dispersion liquid 1 except that the pigment was changed to C.I. Pigment Blue 15:3.

Pigment Dispersion Liquid 3

Pigment dispersion liquid 3 having a pigment content of 10.0% and a resin dispersant content of 3.0% was prepared by the same procedure as pigment dispersion liquid 1 except that the pigment was changed to C.I. Pigment Yellow 74.

Dye 1

A potassium salt (dye 1) represented by formula (1) below was synthesized in a free acid form according to the description regarding the synthetic method in International Publication No. 2006/082669.

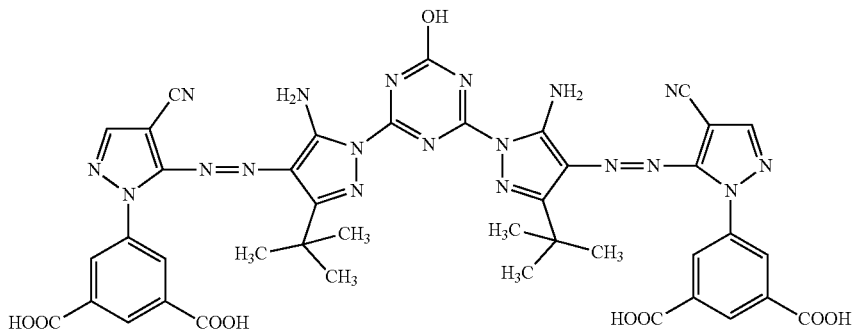

(1)

Preparation of Second Ink

Components (unit: %) indicated in Table 2 were mixed, thoroughly agitated and pressure-filtered with a filter having a pore size of 1.2 μm, and a second ink was obtained as a result. Acetylenol E100 is trade name of a nonionic surfactant produced by Kawaken Fine Chemicals Co., Ltd.

TABLE 2

Composition of second ink (unit: %)

| | Second ink | | | | | |
|---|---|---|---|---|---|---|
| | 1 | 2 | 3 | 4 | 5 | 6 |
| Pigment dispersion liquid 1 | 50.0 | | | | | |
| Pigment dispersion liquid 2 | | 50.0 | | | | |
| Pigment dispersion liquid 3 | | | 50.0 | | | |
| C.I. Acid Blue 9 | | | | 5.0 | | |
| C.I. Acid Red 249 | | | | | 5.0 | |
| Dye 1 | | | | | | 5.0 |
| Glycerin | 15.0 | 15.0 | 15.0 | 15.0 | 15.0 | 15.0 |
| Ethylene glycol | 10.0 | 10.0 | 10.0 | 10.0 | 10.0 | 10.0 |
| Acetylenol E100 | 0.5 | 0.5 | 0.5 | 0.5 | 0.5 | 0.5 |
| Ion exchange water | 69.5 | 69.5 | 69.5 | 24.5 | 24.5 | 24.5 |

Preparation of Substrate

Substrate 1

To 100.0 parts of a leaf bleached kraft pulp stuffy, 20.0 parts of precipitated calcium carbonate was added, and then 2.0 parts of cationic starch and 0.3 parts of an alkenylsuccinic anhydride-based neutral sizing agent were added thereto and mixed to obtain a papermaking raw material. The obtained papermaking raw material was dried by using a Fourdrinier machine until the water content was 10% (on a mass basis) so as to obtain raw base paper. A 7% aqueous solution of oxidized starch was applied to both surfaces of the obtained raw base paper by size pressing so that the total of the applied aqueous solution on the both surfaces was 4 g/m² and then dried until the water content was 7% (on a mass basis) so as to obtain base paper having a basis weight of 110 g/m². A resin composition composed of 70 parts of high-density polyethylene and 20 parts of low-density polyethylene was applied to both surfaces of the obtained base paper by using a melt extruder so that the coating amount was 30 g/m² per surface. Substrate 1 was obtained as a result.

Substrate 2

To 100.0 parts of a leaf bleached kraft pulp shiny, 20.0 parts of precipitated calcium carbonate was added, and then 2.0 parts of cationic starch and 0.3 parts of an alkenylsuccinic anhydride-based neutral sizing agent were added thereto and mixed to obtain a papermaking raw material. The obtained papermaking raw material was dried by using a Fourdrinier machine until the water content was 10% (on a mass basis) so as to obtain raw base paper. A 7% aqueous solution of oxidized starch was applied to both surfaces of the obtained raw base paper by size pressing so that the total of the applied aqueous solution on the both surfaces was 4 g/m² and then dried until the water content was 7% (on a mass basis) so as to obtain base paper having a basis weight of 200 g/m². This base paper was used as substrate 2.

Substrate 3

Synthetic paper formed of polypropylene (trade name: "YUPO HIGH GLOSS GAR 110" produced by YUPO CORPORATION) was used as substrate 3.

Preparation of First Coating Liquid

First, various solutions used to prepare a first coating liquid were prepared. A PVA aqueous solution having a polyvinyl alcohol content of 8.0% was obtained by adding polyvinyl alcohol (trade name: "PVA235" produced by KURARAY CO., LTD., polymerization degree: 3500, saponification degree: 88%) to ion exchange water. Orthoboric acid (crosslinking agent) was added to ion exchange water to obtain an orthoboric acid aqueous solution having a crosslinking agent content of 3.0%. Potassium bromide was added to ion exchange water to obtain a potassium bromide aqueous solution having a potassium bromide content of 10.0%. 1,2,3-Benzotriazole was added to ethanol to obtain a BTA solution having a 1,2,3-benzotriazole content of 10.0%, First Coating Liquid 1

Alumina hydrate (trade name: "DISPERSAL HP14" produced by Sasol) was added to ion exchange water to obtain a dispersion liquid having an alumina hydrate content of 30.0%. To the dispersion liquid, methanesulfonic acid was added so that the methanesulfonic acid (dispersant for alumina hydrate) content relative to the alumina hydrate content was 1.6% and the resulting mixture was thoroughly agitated to obtain a colloidal sot. An appropriate amount of ion exchange water was added to the obtained colloidal sol to obtain dispersion liquid 1 having an inorganic particle (alumina hydrate) content of 27.0%. A PVA aqueous solution was added to dispersion liquid 1 obtained as above so that the polyvinyl alcohol content relative to the inorganic particle content was 11.0%, and mixed. Next, an orthoboric acid aqueous solution was added so that the orthoboric acid content relative to the inorganic particle content was 2.0%, and mixed. As a result, first coating liquid I was obtained.

First Coating Liquid 2

A BTA solution was added to coating liquid 1 obtained as above so that the 1,2,3-benzotriazole content relative to the inorganic particle content was 0.4%, and mixed. Furthermore, a potassium bromide aqueous solution was added so that the potassium bromide content relative to the inorganic particle content was 0.2%, and mixed. As a result, first coating liquid 2 was obtained.

First Coating Liquid 3

A wet-process silica (trade name: "NIPGEL AY-603" produced by Tosoh Silica Corporation) was added to ion exchange water to obtain dispersion liquid 2 having a wet-process silica content of 15.0%. To dispersion liquid 1 obtained as above, dispersion liquid 2 was added so that the mass ratio of alumina hydrate to the wet-process silica was 97.5:2.5, and mixed. As a result, dispersion liquid 3 having an inorganic particle (alumina hydrate and wet-process silica) content of 20.0% was obtained. A PVA aqueous solution was added to dispersion liquid 3 obtained as above so that the polyvinyl alcohol content relative to the inorganic particle content was 5.5%, and mixed. Next, an orthoboric acid aqueous solution was added so that the boric acid content relative to the inorganic particle content was 1.0%, and mixed. A BTA solution was added so that the 1,2,3-benzotriazole content relative to the inorganic particle content was 0.4%, and mixed. Furthermore, a potassium bromide aqueous solution was added so that the potassium bromide content relative to the inorganic particle content was 0.4%, and mixed. As a result, first coating liquid 3 was obtained.

First Coating Liquid 4

An aqueous PVA solution was added to dispersion liquid 1 obtained as above so that the polyvinyl alcohol content relative to the inorganic particle content was 9.5%, and mixed. Next, an aqueous orthoboric acid solution was added so that the boric acid content relative to the inorganic particle content was 0.2%, and was mixed. A BTA solution was added so that the 1,2,3-benzotriazole content relative to the inorganic particle content was 0.4%, and mixed. Furthermore, an aqueous potassium bromide solution was added so that the potassium bromide content relative to the inorganic particle content was 0.3%, and mixed. As a result, first coating liquid 4 was obtained.

First Coating Liquid 5

A potassium bromide aqueous solution was added to coating liquid 1 obtained as above so that the potassium bromide content relative to the inorganic particle content was 0.2%, and mixed. As a result, first coating liquid 5 was obtained.

First Coating Liquid 6

A BTA solution was added to coating liquid 1 obtained as above so that the 1,2,3-benzotriazole content relative to the inorganic particle content was 0.4%, and mixed. As a result, first coating liquid 6 was obtained.

Preparation of Second Coating Liquid

First, nitric acid was added to polyallylamine (trade name: "PAA-01" produced by NITTOBO MEDICAL CO., LTD.) to adjust the pH of the liquid to about 4.0 and to obtain a liquid containing a nitrate salt of polyallylamine. Components (unit: parts) indicated in Table 3 were mixed to obtain a second coating liquid. The used amounts (parts) of components other than the "BTA solution" and "ion exchange water" indicated in Table 3 are on a solid content basis. The BTA solution was the same as that used in preparing the first coating liquid.

TABLE 3

Composition of treatment liquid (unit: parts)

| | Second coating liquid | | | | | | | | | | |
|---|---|---|---|---|---|---|---|---|---|---|---|
| | 1 | 2 | 3 | 4 | 5 | 6 | 7 | 8 | 9 | 10 | 11 |
| Polyallylamine nitrate salt | 100.0 | 100.0 | 100.0 | 100.0 | 100.0 | 100.0 | 100.0 | 100.0 | 100.0 | 100.0 | |
| Polyvinyl pyrrolidone | | | | | | | | | | | 100.0 |
| Potassium bromide | 6.3 | | 3.0 | 6.3 | 1.0 | 4.0 | 8.0 | 9.0 | 6.3 | 6.3 | 5.0 |
| Potassium iodide | | 7.4 | 2.5 | | | | | | | | |
| Potassium chloride | | | | | | | | | | | |
| BTA solution | 100.0 | 100.0 | 100.0 | 100.0 | 100.0 | 100.0 | 100.0 | | | | 100.0 |
| Sodium ascorbate | | | | 20.0 | | | | | | 20.0 | |
| Ion exchange water | 793.7 | 792.6 | 794.5 | 773.7 | 799.0 | 796.0 | 792.0 | 791.0 | 893.7 | 873.7 | 795.0 |

| | Second coating liquid | | | | | | | | | | |
|---|---|---|---|---|---|---|---|---|---|---|---|
| | 12 | 13 | 14 | 15 | 16 | 17 | 18 | 19 | 20 | 21 | 22 |
| Polyvinyl pyrrolidone | 100.0 | 100.0 | 100.0 | 100.0 | 100.0 | 100.0 | 100.0 | 100.0 | 100.0 | 100.0 | 100.0 |
| Potassium bromide | | | | | | | | | | | |
| Potassium iodide | 41.0 | 30.0 | 10.0 | 2.0 | 1.2 | 1.0 | | | | 0.2 | 11.0 |
| Potassium chloride | | | | | | | | | | | |
| BTA solution | | | | | | | | 4.0 | 25.0 | | |
| Sodium ascorbate | 100.0 | 100.0 | 100.0 | 100.0 | 100.0 | 100.0 | 100.0 | 100.0 | 100.0 | 100.0 | 100.0 |
| Ion exchange water | 759.0 | 770.0 | 790.0 | 798.0 | 798.8 | 799.0 | 800.0 | 796.0 | 775.0 | 799.8 | 789.0 |

Recording Medium

The first coating liquid was applied to the substrate so that the thickness after drying would be as indicated in Table 4, and dried at 80° C. Subsequently, for recording media 1 to 20 and 25 to 29, the second coating liquid was further applied so that the dry coating amount was as indicated in Table 4, and dried at 80° C. to obtain recording media. Recording media 21 to 24 were prepared without using the second coating liquid. The paper surface pH of the recording media measured by the aforementioned method was 4.2 in all cases.

TABLE 4

Preparation conditions and properties of recording medium

| Recording medium | Substrate | First coating liquid Type | Thickness after drying (μm) | Second coating liquid Type | Dry coating amount (g/m²) | Bromide ion | Iodide ion | Chloride ion | Halide ion | Cationic resin content (mmol/m²) |
|---|---|---|---|---|---|---|---|---|---|---|
| 1 | 1 | 1 | 35 | 1 | 1.2 | 0.5 | 0.0 | 0.0 | 0.5 | 1.0 |
| 1 | 1 | 1 | 35 | 1 | 1.2 | 0.5 | 0.0 | 0.0 | 0.5 | 1.0 |
| 2 | 2 | 1 | 15 | 1 | 1.2 | 0.5 | 0.0 | 0.0 | 0.5 | 1.0 |
| 3 | 3 | 1 | 22 | 1 | 1.2 | 0.5 | 0.0 | 0.0 | 0.5 | 1.0 |
| 4 | 1 | 1 | 35 | 2 | 1.2 | 0.0 | 0.5 | 0.0 | 0.5 | 1.0 |
| 5 | 1 | 1 | 35 | 3 | 1.2 | 0.3 | 0.2 | 0.0 | 0.5 | 1.0 |
| 6 | 1 | 1 | 35 | 4 | 1.2 | 0.5 | 0.0 | 0.0 | 0.5 | 0.9 |
| 7 | 1 | 1 | 35 | 5 | 1.1 | 0.1 | 0.0 | 0.0 | 0.1 | 1.0 |
| 8 | 1 | 1 | 35 | 6 | 1.1 | 0.3 | 0.0 | 0.0 | 0.3 | 1.0 |
| 9 | 1 | 1 | 35 | 7 | 1.2 | 0.7 | 0.0 | 0.0 | 0.7 | 1.0 |
| 10 | 1 | 1 | 35 | 8 | 1.2 | 0.8 | 0.0 | 0.0 | 0.8 | 1.0 |
| 11 | 1 | 1 | 35 | 9 | 1.0 | 0.5 | 0.0 | 0.0 | 0.5 | 0.9 |
| 12 | 1 | 1 | 35 | 10 | 1.2 | 0.5 | 0.0 | 0.0 | 0.5 | 1.0 |
| 13 | 1 | 1 | 35 | 11 | 1.3 | 0.5 | 0.0 | 0.0 | 0.5 | 0.0 |
| 13 | 1 | 1 | 35 | 11 | 1.3 | 0.5 | 0.0 | 0.0 | 0.5 | 0.0 |
| 14 | 1 | 1 | 35 | 12 | 0.2 | 0.5 | 0.0 | 0.0 | 0.5 | 0.1 |
| 15 | 1 | 1 | 35 | 13 | 0.3 | 0.5 | 0.0 | 0.0 | 0.5 | 0.2 |
| 16 | 1 | 1 | 35 | 14 | 0.7 | 0.5 | 0.0 | 0.0 | 0.5 | 0.6 |
| 17 | 1 | 1 | 35 | 15 | 3.4 | 0.5 | 0.0 | 0.0 | 0.5 | 3.0 |
| 18 | 1 | 1 | 35 | 16 | 5.6 | 0.5 | 0.0 | 0.0 | 0.5 | 5.0 |
| 19 | 1 | 1 | 35 | 17 | 6.1 | 0.5 | 0.0 | 0.0 | 0.5 | 5.5 |
| 20 | 1 | 2 | 35 | — | — | 0.5 | 0.0 | 0.0 | 0.5 | 0.0 |
| 21 | 2 | 3 | 15 | — | — | 0.5 | 0.0 | 0.0 | 0.5 | 0.0 |
| 22 | 3 | 4 | 22 | — | — | 0.5 | 0.0 | 0.0 | 0.5 | 0.0 |
| 23 | 1 | 5 | 35 | — | — | 0.5 | 0.0 | 0.0 | 0.5 | 0.0 |
| 24 | 1 | 6 | 35 | — | — | 0.0 | 0.0 | 0.0 | 0.0 | 0.0 |
| 25 | 1 | 1 | 35 | 18 | 0.9 | 0.0 | 0.0 | 0.0 | 0.0 | 0.8 |
| 26 | 1 | 1 | 35 | 19 | 1.1 | 0.0 | 0.0 | 0.5 | 0.5 | 1.0 |
| 27 | 1 | 1 | 35 | 20 | 1.1 | 0.0 | 0.0 | 2.7 | 2.7 | 0.8 |
| 28 | 1 | 1 | 35 | 21 | 1.2 | 0.02 | 0.0 | 0.0 | 0.02 | 1.1 |
| 29 | 1 | 1 | 35 | 22 | 1.2 | 0.9 | 0.0 | 0.0 | 0.9 | 1.0 |

Preparation and Evaluation of Recorded Matter

The inks prepared as above were loaded into ink cartridges, and the cartridges in a combination indicated on the left side of Table 5 were placed in an ink jet recording apparatus (trade name: "PIXUS MG3630" produced by CANON KABUSHIKI KAISHA) equipped with a recording head that ejects the inks by thermal energy. Examples, the definition of a recording duty of 100% for the first ink is that an image is recorded by applying two ink droplets each about 11.2 ng to a 1/600 inch×1/600 inch unit region. Moreover, the definition of a recording duty of 100% for the second ink is that an image is recorded by applying two ink droplets each about 5.7 ng to a 1/600 inch×1/600 inch unit region. In the present disclosure, for each items of the evaluation standards, AAA, AA, A and B are acceptable levels and C is an unacceptable level. The evaluation results are indicated in Table 5.

Color Developability

An image was recorded on a recording medium indicated on the left side of Table 5 by applying the first ink by using the ink jet recording apparatus described above so that the recording duty was 100%. Subsequently, each of three types of second ink was applied so as to overlap the region (first ink image) where the first ink had been applied so that the recording duty was 100%. As a result, recorded matters with three types of solid images recorded thereon were prepared. The obtained recorded matters were subjected to the following colorimetry on SCI (specular component included) mode by using an integrating sphere-type spectrophotometer (trade name: "CM-2600d" produced by Konica Minolta Japan, Inc.). The following chromaticity (a* and b*) is the values in the L*a*b* system defined by' International Commission on Illumination (CIE). First, the chromaticity ($a_0^*$ and $b_0^*$) of an image in a portion recorded with only the first ink was measured. In addition, the chromaticity ($a_1^*$ and $b_1^*$) of an image in a portion recorded with both the first ink and the second ink was measured in the same manner. The color difference $\Delta E_{ab}$ was calculated from the formula $\Delta E_{ab} = \{(a_1^* - a_0^*)^2 + (b_1^* - b_o^*)^2\}^{1/2}$ and the color developability was evaluated according to the evaluation standard below. $\Delta E_{ab}$ is an index indicating the color tone of the image recorded with the first ink and the second ink as a "deviation" with reference to the color tone of the image recorded with the first ink. Thus, a high value of $\Delta E_{ab}$ means that the color tone of the coloring material used in the second ink is easily recognizable from the image. Under these evaluation conditions, an image having $\Delta E_{ab}$ of 2.0 or more is considered to be an image in which the color tone of the coloring material used in the second ink is recognizable with naked eye rather than the color tone of the silver particle (silver color).

AAA: $\Delta E_{ab}$ was 6.0 or more to less than 10.0 for all three types of second ink.

AA: Among three types of second ink, two yielded $\Delta E_{ab}$ of 6.0 or more to less than 10.0 and one yielded $\Delta E_{ab}$ of 2.0 or more and less than 6.0.

A: Among three types of second ink, two yielded $\Delta E_{ab}$ of 6.0 or more to less than 10.0 and one yielded $\Delta E_{ab}$ of less than 2.0.

B: Among three types of second ink, two yielded $\Delta E_{ab}$ of 2.0 or more to less than 6.0 and one yielded $\Delta E_{ab}$ of less than 2.0.

C: $\Delta E_{ab}$ was less than 2.0 for all three types of second ink.

Suppressing Degradation of Gloss

A solid image having a recording duty of 100% was recorded by using the ink jet recording apparatus described above by applying the first ink to a recording medium indicated on the left side of Table 5. The solid image was left in a 25° C., 50% environment for 1 day, and then the 20° glossiness $G_1$ of the solid image was measured with a gloss meter (trade name: "VG-7000" produced by NIPPON DENSHOKU INDUSTRIES Co., LTD). Subsequently, the solid image was placed in a gas corrosion tester (Suga Test Instruments Co., Ltd.) and exposed to mixed gas at a chamber inner temperature of 25° C. and a relative humidity of 80% for 36 hours. A mixture of a 0.90 ppm $NO_2$ gas, 0.05 ppm $SO_2$ gas and 0.15 ppm $O_3$ gas was used as the mixed gas. The 20° glossiness $G_2$ was measured in the same manner on the solid image after the exposure. The gloss retention rate was calculated from the formula, gloss retention rate=$G_2/G_1 \times 100$(%) and the glossiness of the image was evaluated.

AA: The gloss retention rate was 75% or more.

A: The gloss retention rate was 60% or more to less than 75%.

B: The gloss retention rate was 50% or more tk less than 60%.

C: The gloss retention rate was less than 50%.

TABLE 5

Evaluation results

| | | Evaluation conditions | | | Evaluation results | |
|---|---|---|---|---|---|---|
| | | First ink | Second ink | Recording medium | Color developability | Suppressing degradation of gloss |
| Examples | 1 | 1 | 1 | 1 | AAA | AA |
| | 2 | 1 | 2 | 1 | AAA | AA |
| | 3 | 1 | 1 | 2 | AAA | AA |
| | 4 | 1 | 1 | 3 | AAA | AA |
| | 5 | 1 | 1 | 4 | AAA | AA |
| | 6 | 1 | 1 | 5 | AAA | AA |
| | 7 | 1 | 1 | 6 | AAA | AA |
| | 8 | 1 | 1 | 7 | A | AA |
| | 9 | 1 | 1 | 8 | AAA | AA |
| | 10 | 1 | 1 | 9 | AAA | AA |
| | 11 | 1 | 1 | 10 | AAA | B |
| | 12 | 1 | 1 | 11 | AAA | B |
| | 13 | 1 | 1 | 12 | AAA | A |
| | 14 | 1 | 1 | 13 | A | AA |
| | 15 | 1 | 2 | 13 | B | AA |
| | 16 | 1 | 2 | 14 | A | AA |
| | 17 | 1 | 2 | 15 | AA | AA |
| | 18 | 1 | 2 | 16 | AAA | AA |
| | 19 | 1 | 2 | 17 | AAA | AA |
| | 20 | 1 | 2 | 18 | AA | AA |
| | 21 | 1 | 2 | 19 | A | AA |
| | 22 | 1 | 1 | 20 | B | AA |
| | 23 | 1 | 1 | 21 | B | AA |
| | 24 | 1 | 1 | 22 | B | AA |
| | 25 | 2 | 1 | 1 | AAA | AA |
| | 26 | 3 | 1 | 1 | AA | AA |
| | 27 | 3 | 1 | 23 | B | B |

TABLE 5-continued

Evaluation results

| | | Evaluation conditions | | | Evaluation results | |
|---|---|---|---|---|---|---|
| | | First ink | Second ink | Recording medium | Color developability | Suppressing degradation of gloss |
| Comparative Examples | 1 | 1 | 1 | 24 | C | AA |
| | 2 | 1 | 1 | 25 | C | AA |
| | 3 | 1 | 1 | 26 | C | AA |
| | 4 | 1 | 1 | 27 | AAA | C |
| | 5 | 1 | 1 | 28 | C | AA |
| | 6 | 1 | 1 | 29 | AA | C |

According to the present disclosure, a recording method and a recording apparatus with which a color metallic image having excellent color developability and excellent glossiness even after the image is stored can be recorded can be provided. According to another aspect of the present disclosure, a color metallic recorded matter having excellent color developability and excellent glossiness even after the image is stored can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-184608, filed Sep. 28, 2018 and No. 2019-153143 filed Aug. 23, 2019 which are hereby incorporated by reference herein in their entirety.

What is claimed is:

1. A recording method comprising:
applying a first ink to a recording medium; and
recording an image on the recording medium by applying a second ink so that the second ink at least partially overlaps a region to which the first ink has been applied,
wherein the first ink is an aqueous ink comprising a silver particle,
the second ink is an aqueous ink comprising a coloring material,
the recording medium has an ink receiving layer that comprises a halide ion selected from the group consisting of a bromide ion and an iodide ion, and
the ink receiving layer has a halide ion content of 0.1 mmol/m² or more to 0.8 mmol/m² or less.

2. The recording method according to claim 1, wherein the ink receiving layer comprises an antirust agent.

3. The recording method according to claim 2, wherein the antirust agent is 1,2,3-benzotriazole or a derivative thereof.

4. The recording method according to claim 1, wherein the ink receiving layer comprises an antioxidant.

5. The recording method according to claim 4, wherein the antioxidant is ascorbic acid or a slat thereof.

6. The recording method according to claim 1, wherein the ink receiving layer comprises a cationic resin.

7. The recording method according to claim 6, wherein the cationic resin is a resin having an amine structure.

8. The recording method according to claim 6, wherein the ink receiving layer has a cationic resin content (g/m²) of 0.2 g/m² or more to 5.0 g/m² or less.

9. The recording method according to claim 1, wherein the silver particle has a volume-based cumulative 50% particle size (nm) of 150 nm or less.

10. The recording method according to claim 1, wherein the first ink and the second ink are applied to the recording medium by ejecting the first ink and the second ink from an ink jet recording head.

11. The recording method according to claim 1, wherein the ink receiving layer has a halide ion content ($mmol/m^2$) of 0.3 $mmol/m^2$ or more to 0.7 $mmol/m^2$ or less.

12. The recording method according to claim 5, wherein the ink receiving layer has a cationic resin content ($g/m^2$) of 0.6 $g/m^2$ or more to 3.0 $g/m^2$ or less.

13. The recording method according to claim 2, wherein the ink receiving layer has an antirust agent content ($g/m^2$) of 0.02 $g/m^2$ or more to 0.15 $g/m^2$ or less.

14. The recording method according to claim 2, wherein the ink receiving layer has an antioxidant content ($g/m^2$) of 0.05 $g/m^2$ or more to 0.25 $g/m^2$ or less.

15. The recording method according to claim 2, wherein the recording medium has an ink receiving layer that comprises the bromide ion.

16. The recording method according to claim 1, wherein the first ink has a silver particle content (% by mass) of 2.0% by mass or more to 15.0% by mass or less with respect to the total mass of the ink.

17. The recording method according to claim 1, wherein the coloring material of the second ink comprises at least one of a dye and a pigment.

* * * * *